(12) United States Patent
Lee et al.

(10) Patent No.: US 9,846,336 B2
(45) Date of Patent: Dec. 19, 2017

(54) LIQUID CRYSTAL DISPLAY DEVICE

(71) Applicant: LG DISPLAY CO., LTD., Seoul (KR)

(72) Inventors: JaeSeok Lee, Gumi-si (KR); Daejin Lee, Daegu (KR); DongKon Kwak, Gumi-si (KR); Hyangsook Yim, Pohang-si (KR)

(73) Assignee: LG DISPLAY CO., LTD., Seoul (KR)

(*) Notice: Subject to any disclaimer, the term of this patent is extended or adjusted under 35 U.S.C. 154(b) by 36 days.

(21) Appl. No.: 14/964,177

(22) Filed: Dec. 9, 2015

(65) Prior Publication Data
US 2016/0187704 A1    Jun. 30, 2016

(30) Foreign Application Priority Data
Dec. 31, 2014   (KR) .......................... 10-2014-0195828

(51) Int. Cl.
*G02F 1/1339*    (2006.01)

(52) U.S. Cl.
CPC .................... *G02F 1/13394* (2013.01); *G02F 2001/13396* (2013.01)

(58) Field of Classification Search
CPC .................. G02F 1/13394; G02F 2001/13396
See application file for complete search history.

(56) References Cited

U.S. PATENT DOCUMENTS

| | | | |
|---|---|---|---|
| 8,368,864 B2* | 2/2013 | Nagami | G02F 1/1339 349/153 |
| 2012/0320295 A1* | 12/2012 | Nagami | G02F 1/133345 349/43 |
| 2014/0104548 A1* | 4/2014 | Yang | G02F 1/133512 349/106 |

* cited by examiner

*Primary Examiner* — Kendrick Hsu
(74) *Attorney, Agent, or Firm* — Dentons US LLP

(57) ABSTRACT

Disclosed is a liquid crystal display device including first and second substrates, each of the substrates having a display area and a non-display area; a liquid crystal layer between the first and second substrates; a column spacer in each of the display area and the non-display area on the first substrate; and a thin film layer stack in each of the display area and the non-display area on the second substrate, wherein a distance from the second substrate to an end of the thin film layer stack in the display area is identical to a distance from the second substrate to an end of the thin film layer stack in the non-display area.

18 Claims, 4 Drawing Sheets non-display area non-display area non-display area display area non-display area          display area

LIQUID CRYSTAL DISPLAY DEVICE

CROSS REFERENCE TO RELATED APPLICATIONS

This application claims the benefit of the Korean Patent Application No. 10-2014-0195828 filed on Dec. 31, 2014, which is hereby incorporated by reference for all purposes as if fully set forth herein.

BACKGROUND

Field of the Invention

Embodiments of the present invention relate to a liquid crystal display device, and more particularly, to a column spacer for maintaining a cell gap of a liquid crystal display device.

Discussion of the Related Art

Owing to advantages such as good portability and low power consumption by low operating voltage, a liquid crystal display (LCD) device is widely used in various fields of notebook computer, monitor, spacecraft, aircraft, and etc.

The LCD device includes a lower substrate with a thin film transistor formed thereon, an upper substrate with a color filter formed thereon, and a liquid crystal layer formed between the lower and upper substrates. Also, a column spacer for maintaining a cell gap between the lower and upper substrates is formed between the lower and upper substrates.

Hereinafter, a related art LCD device will be described with reference to the accompanying drawings.

FIG. 1A is a plane view illustrating the related art LCD device. FIG. 1B is a cross sectional view illustrating the related art LCD device, wherein FIG. 1B is a cross sectional view along A-B line and C-D line of FIG. 1A.

As shown in FIG. 1A, the related art LCD device 1 includes a display area for displaying an image, and a non-display area prepared in the periphery of the display area. A column spacer 30 is provided in each of the display area and the non-display area.

As shown in FIG. 1B, the column spacer 30 is formed between a lower substrate 20 and an upper substrate 10. In more detail, a light-shielding layer 12 is formed in the display area and the non-display area on the upper substrate 10. The column spacer 30 is provided on the light-shielding layer 12. That is, a cross sectional structure of the region with the column spacer 30 in the display area on the upper substrate 10 is identical to a cross sectional structure of the region with the column spacer 30 in the non-display area on the upper substrate 10.

However, in case of the lower substrate 20, a cross sectional structure of the display area is different from a cross sectional structure of the non-display area. That is, in case of the display area, a thin film transistor layer 22 is formed on the lower substrate 20. Meanwhile, in case of the non-display area, the thin film transistor layer 22 is not formed on the lower substrate 20.

In case of the region with the column spacer 30, the cross sectional structure of the display area on the lower substrate 20 is different from the cross sectional structure of the non-display area on the lower substrate 20. In more detail, a distance (D1) between the column spacer 30 and the lower substrate 20 in the non-display area is longer than a distance (D2) between the column spacer 30 and the thin film transistor layer 22 of the lower substrate 20 in the display area.

Accordingly, a cell gap (D1) of the non-display area is larger than a cell gap (D2) of the display area, whereby an entire cell gap of the liquid crystal display device is not uniform.

SUMMARY

Accordingly, embodiments of the present invention are directed to a liquid crystal display device that substantially obviates one or more problems due to limitations and disadvantages of the related art.

An aspect of embodiments of the present invention is to provide a liquid crystal display device which is capable of maintaining a uniform cell gap in both a display area and a non-display area.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a liquid crystal display device that may include first and second substrates, each having a display area and a non-display area; a liquid crystal layer between the first and second substrates; a column spacer in each of the display area and the non-display area on the first substrate; and a thin film layer in each of the display area and non-display area on the second substrate, wherein a distance from the second substrate to an end of the thin film layer in the display area is identical to a distance from the second substrate to an end of the thin film layer in the non-display area.

In another aspect of the present invention, there is provided a liquid crystal display device comprising: first and second substrates; a liquid crystal layer between the first and second substrates; at least one column spacer in each of a display area and a non-display area of the liquid crystal display device on the first substrate; and a thin film layer stack in the display area and non-display area on the second substrate, wherein a distance from the second substrate to an end of a portion of the thin film layer stack in the display area is identical to a distance from the second substrate to an end of a portion of the thin film layer stack in the non-display area, said portion of the thin film layer stack in the display area disposed between the second substrate and said at least one column spacer in the display area, and said portion of the thin film layer stack in the non-display area disposed between the second substrate and said at least one column spacer in the non-display area, wherein a stacking structure of the portion of the thin film layer stack in the display area is identical to a stacking structure of the portion of the thin film layer stack in the non-display area.

In one or more embodiments, said end of said portion of the thin film layer stack in the non-display area or display area corresponds to an upper surface of the thin film layer stack that is in contact with the liquid crystal layer.

In one or more embodiments, a distance from the first substrate to a lower end of the at least one column spacer in the non-display area is identical to a distance from the first substrate to a lower end of the at least one column spacer in the display area.

In one or more embodiments, a distance between said end of said portion of the thin film layer stack in the non-display area and the at least one column spacer in the non-display area is identical to a distance between said end of said portion of the thin film layer stack in the display area and the at least one column spacer in the display area.

In one or more embodiments, the at least one column spacer in the display area and/or the at least one column spacer in the non-display area comprises a main column spacer and an auxiliary column spacer, wherein the auxiliary column spacer is shorter than the main column spacer. The main column spacer may be in contact with the thin film layer stack.

In one or more embodiments, the at least one column spacer in the non-display area comprises a plurality of column spacers spaced apart from one another, wherein a stacking structure of the thin film layer stack in a region of the non-display area having a column spacer is identical to a stacking structure of the thin film layer stack in a region of the non-display area not having a column spacer.

In one or more embodiments, the at least one column spacer in the non-display area comprises a plurality of column spacers spaced apart from one another, wherein a stacking structure of the thin film layer stack in a region of the non-display area having a column spacer is different from a stacking structure of the thin film layer stack in a region of the non-display area not having a column spacer. In this case, the thin film layer stack may comprise a liquid crystal receiving portion in the region of the non-display area not having a column spacer.

In one or more embodiments, in the region of the non-display area having a column spacer the thin film layer stack comprises a signal line, a gate insulating film on the signal line, a semiconductor layer on the gate insulating film, a metal layer on the semiconductor layer and a passivation layer on the metal layer, and in the region of the non-display area not having a column spacer the film layer stack comprises the signal line, the gate insulating film on the signal line, and the passivation layer on the gate insulating film and in contact with the gate insulating film.

In one or more embodiments, the thin film layer stack in each of the display area and non-display area comprises a passivation layer, and said end of said portion of the thin film layer stack in the display area or non-display area corresponds to an upper surface of the passivation layer that is in contact with the liquid crystal layer.

In one or more embodiments, the thin film layer stack in the display area comprises: a gate electrode; a gate insulating film on the gate electrode; a semiconductor layer on the gate insulating film; a source electrode and a drain electrode on the semiconductor layer; and the passivation layer on the source and drain electrodes; and the thin film layer stack in the non-display area comprises: a signal line; a gate insulating film on the signal line; a semiconductor layer on the gate insulating film; a metal layer on the semiconductor layer; and the passivation layer on the metal layer.

In one or more embodiments, a thickness of the gate electrode is identical to a thickness of the signal line; a thickness of the gate insulating film in the display area is identical to a thickness of the gate insulating film in the non-display area; a thickness of the semiconductor layer in the display area is identical to a thickness of the semiconductor layer in the non-display area; a thickness of the source and drain electrodes in the display area is identical to a thickness of the metal layer in the non-display area; and a thickness of the passivation layer in the display area is identical to a thickness of the passivation layer in the non-display area.

In one or more embodiments, the gate electrode and the signal line are formed of the same material by the same manufacturing process; the gate insulating film on the gate electrode and the gate insulating film on the signal line are formed of the same material by the same manufacturing process; the semiconductor layer in the display area and the semiconductor layer in the non-display area are formed of the same material by the same manufacturing process; the source and drain electrodes and the metal layer are formed of the same material by the same manufacturing process; and the passivation layer in the display area and the passivation layer in the non-display area are formed of the same material by the same manufacturing process.

In one or more embodiments, the thin film layer stack in the display area comprises: a semiconductor layer; a gate insulating film on the semiconductor layer; a gate electrode on the gate insulating film; an insulating interlayer film on the gate electrode; a source electrode and a drain electrode on the insulating interlayer film; and the passivation layer on the source and drain electrodes; and the thin film layer stack in the non-display area comprises: a semiconductor layer; a gate insulating film on the semiconductor layer; a signal line on the gate insulating film; an insulating interlayer film on the signal line; a metal layer on the insulating interlayer film; and the passivation layer on the metal layer.

In one or more embodiments, a thickness of the semiconductor layer in the display area is identical to a thickness of the semiconductor layer in the non-display area; a thickness of the gate insulating film in the display area is identical to a thickness of the gate insulating film in the non-display area; a thickness of the gate electrode in the display area is identical to a thickness of the signal line in the non-display area; a thickness of the insulating interlayer film in the display area is identical to a thickness of the insulating interlayer film in the non-display area; a thickness of the source and drain electrodes in the display area is identical to a thickness of the metal layer in the non-display area; and a thickness of the passivation layer in the display area is identical to a thickness of the passivation layer in the non-display area.

In one or more embodiments, the liquid crystal display device further comprises a light shielding layer on the first substrate and an overcoat layer on the light shielding layer, wherein the at least one column spacer in each of the display area and non-display area is disposed on the overcoat layer.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1A:
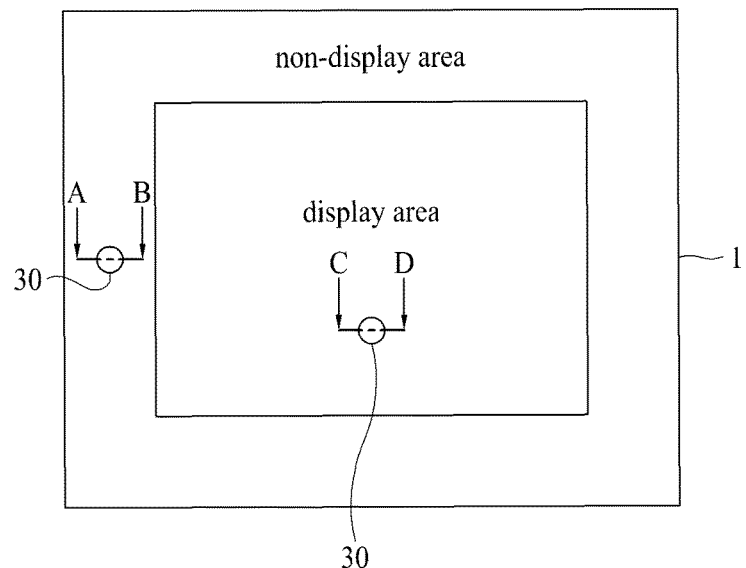
FIG. 1A is a plane view illustrating a related art LCD device.
Figure 1B:
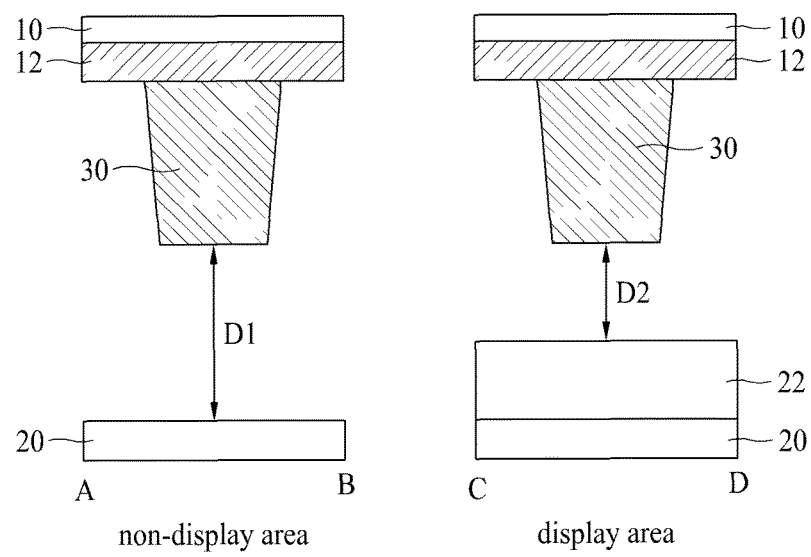
FIG. 1B is a cross sectional view illustrating the related art LCD device.

Reference will now be made in detail to the exemplary embodiments of the present invention, examples of which are illustrated in the accompanying drawings. Wherever possible, the same reference numbers will be used throughout the drawings to refer to the same or like parts.

Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims.

A shape, a size, a ratio, an angle, and a number disclosed in the drawings for describing embodiments of the present invention are merely an example, and thus, the present invention is not limited to the illustrated details. Like reference numerals refer to like elements throughout. In the following description, when the detailed description of the relevant known function or configuration is determined to unnecessarily obscure the important point of the present invention, the detailed description will be omitted. In a case where 'comprise', 'have', and 'include' described in the present specification are used, another part may be added unless 'only~' is used. The terms of a singular form may include plural forms unless referred to the contrary. In construing an element, the element is construed as including an error region although there is no explicit description.

In description of embodiments of the present invention, when a structure (for example, an electrode, a line, a wiring, a layer, or a contact) is described as being formed at an upper portion/lower portion of another structure or on/under the other structure, this description should be construed as including a case where the structures contact each other and moreover, a case where a third structure is disposed therebetween.

In describing a time relationship, for example, when the temporal order is described as 'after~', 'subsequent~', 'next~', and 'before~', a case which is not continuous may be included unless 'just' or 'direct' is used.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the present invention.

Features of various embodiments of the present invention may be partially or overall coupled to or combined with each other, and may be variously inter-operated with each other and driven technically as those skilled in the art can sufficiently understand. The embodiments of the present invention may be carried out independently from each other, or may be carried out together in co-dependent relationship.

Hereinafter, embodiments of the present invention will be described with reference to the accompanying drawings.

Figure 2:
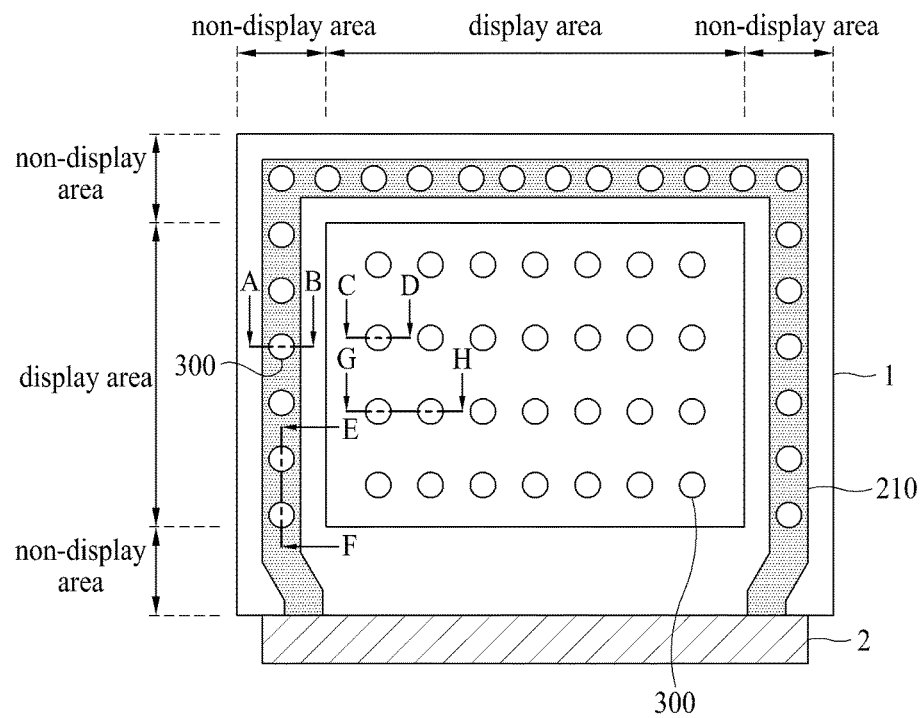
FIG. 2 is a plane view illustrating an LCD device according to one embodiment of the present invention.

FIG. 2 is a plane view illustrating an LCD device according to one embodiment of the present invention.

As shown in FIG. 2, the LCD device 1 according to one embodiment of the present invention may include a display area for displaying an image, and a non-display area prepared in the periphery of the display area. The non-display area may at least partially surround the display area. The non-display area, alternatively, may fully surround the display area. The non-display area may be an area that does not display any images. The non-display area may be an area that does not have any pixels.

In the display area, although not shown, there are a plurality of pixels defined by gate and data lines crossing each other, and a thin film transistor, a pixel electrode and a common electrode are formed in each pixel. The thin film transistor is connected with respective gate and data lines. The pixel electrode is connected with the thin film transistor. The common electrode together with the pixel electrode forms an electric field.

In the display area, a plurality of column spacers 300 are formed so as to maintain a cell gap of the LCD device. The plurality of column spacers 300 may be overlapped with the thin film transistors, which will be easily understood with reference to the following cross sectional views. For example, each column spacer 300 may be overlapped with a thin film transistor.

A signal line 210 is provided in the non-display area. The signal line 210 extends along the periphery of the display area. Although not shown in detail, the signal line 210 may be connected with the common electrode formed in the display area, whereby a common signal may be applied to the common electrode via the signal line 210. The signal line 210 is connected with a flexible printed circuit (FPC) film 2, whereby the common signal may be supplied via the FPC film 2. The FPC film 2 may be attached to the non-display area while being in contact with the signal line 210.

In the non-display area, there are a plurality of column spacers 300. The plurality of column spacers 300 may be overlapped with the signal line 210.

Figure 3:
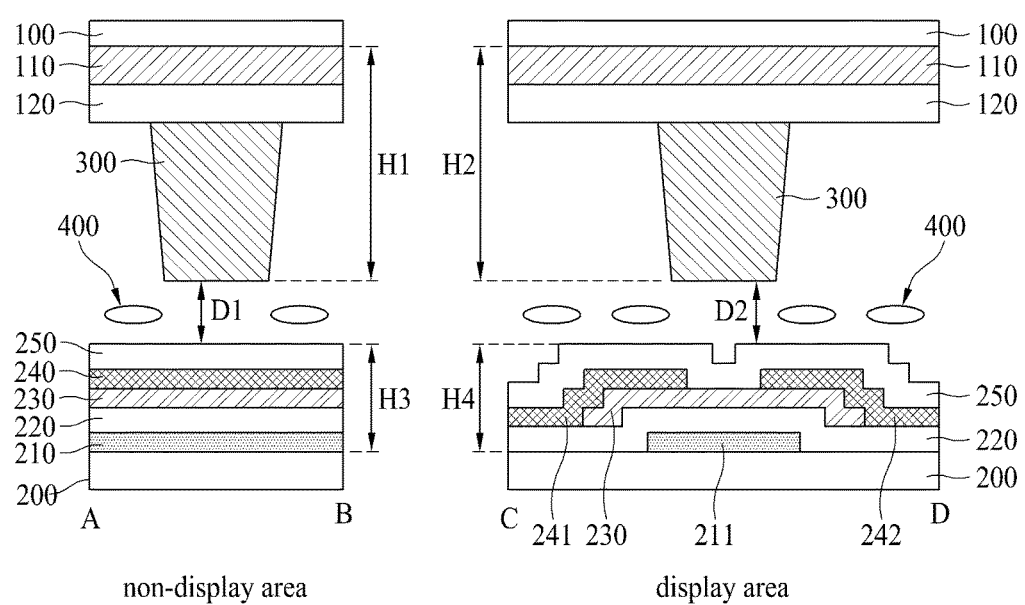
FIG. 3 is a cross sectional view illustrating the LCD device according to one embodiment of the present invention, which corresponds to a cross sectional view along A-B line and C-D line of FIG. 2.

FIG. 3 is a cross sectional view illustrating the LCD device according to one embodiment of the present invention, which corresponds to a cross sectional view along A-B line and C-D line of FIG. 2.

First, a structure of a first substrate 100 in the non-display area will be described in detail as follows. The first substrate 100 may be an upper substrate.

A light-shielding layer 110 is formed on a lower surface of the first substrate 100, an overcoat layer 120 is formed on a lower surface of the light-shielding layer 110, and the column spacer 300 is formed on a lower surface of the overcoat layer 120. Herein above, the term "lower surface" refers to a surface facing towards a liquid crystal layer 400 of the LCD device.

The light-shielding layer 110 is formed on the entire non-display area, to thereby prevent a light from leaking in the non-display area. The overcoat layer 120 is provided to planarize a surface of the first substrate 100. The column spacer 300 may be attached to the lower surface of the overcoat layer 120. The column spacer 300 may not be in contact with a second substrate 200. The column spacer 300, which is not in contact with the second substrate 200, serves as an auxiliary column spacer for helping a cell gap maintenance and improving fluidity of the liquid crystal layer 400. This will be described later in detail with reference to FIG. 6.

A structure of the first substrate 100 in the display area will be described in detail as follows.

A light-shielding layer 110 is formed on a lower surface of the first substrate 100, an overcoat layer 120 is formed on a lower surface of the light-shielding layer 110, and the column spacer 300 is formed on a lower surface of the overcoat layer 120. The column spacer 300 is overlapped with a thin film transistor prepared in the display area of the second substrate 200. That is, the column spacer 300 may be overlapped with at least one among a gate electrode 211, a semiconductor layer 230, a source electrode 241 and a drain electrode 242 of the thin film transistor prepared in the display area of the second substrate 200.

A stacking structure of the first substrate 100 in the display area is identical to a stacking structure of the first substrate 100 in the non-display area. Accordingly, a distance (H1) from the first substrate 100 (e.g., from the lower surface of the first substrate) to a lower end of the column spacer 300 in the non-display area is identical to a distance (H2) from the first substrate 100 (e.g., from the lower surface of the first substrate) to a lower end of the column spacer 300 in the display area. Herein above, the term "lower end" refers to an end proximate the liquid crystal layer 400.

Then, a structure of the second substrate 200 in the non-display area will be described in detail as follows.

On the second substrate 200 in the non-display area, there is a thin film layer stack including a signal line 210, a gate insulating film 220, a semiconductor layer 230, a metal layer 240 and a passivation layer 250.

In more detail, the signal line 210 is formed on an upper surface of the second substrate 200, the gate insulating film 220 is formed on an upper surface of the signal line 210, the semiconductor layer 230 is formed on an upper surface of the gate insulating film 220, the metal layer 240 is formed on an upper surface of the semiconductor layer 230, and the passivation layer 250 is formed on an upper surface of the metal layer 240. Herein above, the term "upper surface" refers to a surface facing towards the liquid crystal layer 400.

As described above, the signal line 210 is provided to apply the common signal to the common electrode. The gate insulating film 220 insulates the gate electrode 211 and the semiconductor layer 230 from each other in the display area, wherein the gate insulating film 220 extends from the display area to the non-display area. The semiconductor layer 230 of the non-display area and the semiconductor layer 230 of the display area are formed of the same material by the same manufacturing process. The metal layer 240 of the non-display area and the source and drain electrodes 241 and 242 of the display area are formed of the same material by the same manufacturing process. The passivation layer 250 is provided to protect the thin film transistor of the display area, wherein the passivation layer 250 extends from the display area to the non-display area.

A structure of the second substrate 200 in the display area will be described in detail as follows.

On the second substrate 200 in the display area, there is a thin film layer stack including a gate electrode 211, a gate insulating film 220, a semiconductor layer 230, a source or drain electrode 241 or 242, and a passivation layer 250.

In more detail, the gate electrode 211 is formed on an upper surface of the second substrate 200, the gate insulating film 220 is formed on an upper surface of the gate electrode 211, the semiconductor layer 230 is formed on an upper surface of the gate insulating film 220, the source and drain electrodes 241 and 242 facing each other are formed on an upper surface of the semiconductor layer 230, and the passivation layer 250 is formed on an upper surface of the source and drain electrodes 241 and 242. Herein above, the term "upper surface" refers to a surface facing towards the liquid crystal layer 400.

A stacking structure of the second substrate 200 in the display area is identical to a stacking structure of the second substrate 200 in the non-display area.

In case of the display area, the gate electrode 211, the gate insulating film 220, the semiconductor layer 230, the source/drain electrode 241/242 and the passivation layer 250 are sequentially stacked on the second substrate 200. In case of the non-display area, the signal line 210, the gate insulating film 220, the semiconductor layer 230, the metal layer 240 and the passivation layer 250 are sequentially stacked on the second substrate 200. At this time, a thickness of the gate electrode 211 in the display area is identical to a thickness of the signal line 210 in the non-display area, a thickness of the gate insulating film 220 in the display area is identical to a thickness of the gate insulating film 220 in the non-display area, a thickness of the semiconductor layer 230 in the display area is identical to a thickness of the semiconductor layer 230 in the non-display area, a thickness of the source/drain electrode 241/242 in the display area is identical to a thickness of the metal layer 240 in the non-display area, and a thickness of the passivation layer 250 in the display area is identical to a thickness of the passivation layer 250 in the non-display area.

Accordingly, a distance (H3) from the second substrate 200 (e.g., from the upper surface of the second substrate) to an upper end of the thin film layer stack in the non-display area is identical to a distance (H4) from the second substrate 200 (e.g., from the upper surface of the second substrate) to an upper end of the thin film layer stack in the display area. In other words, the distance (H3) from the second substrate 200 (e.g., from the upper surface of the second substrate) to an upper end of the passivation layer 250 in the non-display area is identical to the distance (H4) from the second substrate 200 (e.g., from the upper surface of the second substrate) to the upper end of the passivation layer 250 in the display area. Herein above, the term "upper end" refers to an end proximate the liquid crystal layer 400.

As explained above, according to one embodiment of the present invention, the distance (H1) from the first substrate 100 (e.g., from the lower surface of the first substrate) to the lower end of the column spacer 300 in the non-display area is identical to the distance (H2) from the first substrate 100 (e.g., from the lower surface of the first substrate) to the lower end of the column spacer 300 in the display area. Also, the distance (H3) from the second substrate 200 (e.g., from the upper surface of the second substrate) to the upper end of the passivation layer 250 in the non-display area is identical to the distance (H4) from the second substrate 200

(e.g., from the upper surface of the second substrate) to the upper end of the passivation layer 250 in the display area.

Accordingly, a distance (D1) from the lower end of the column spacer 300 to the upper end of the thin film layer stack or the passivation layer 250 in the non-display area is identical to a distance (D2) from the lower end of the column spacer 300 to the upper end of the thin film layer stack or the passivation layer 250 in the display area. As a result, it is possible to maintain a uniform cell gap in both the display area and the non-display area.

Figure 4:
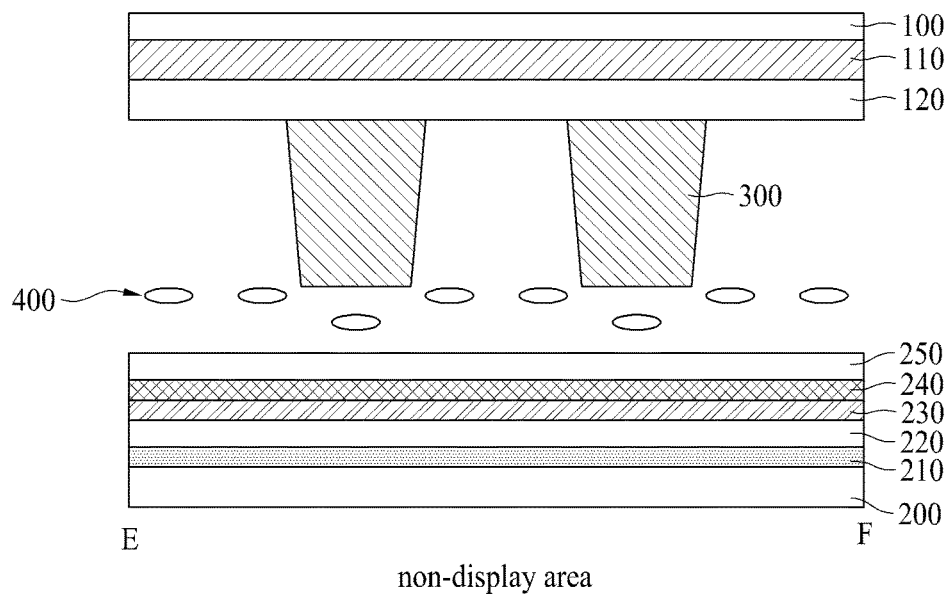
FIG. 4 is a cross sectional view illustrating a non-display area according to one embodiment of the present invention, which corresponds to a cross sectional view along E-F line of FIG. 2.

FIG. 4 is a cross sectional view illustrating the non-display area in the LCD device according to one embodiment of the present invention, which corresponds to a cross sectional view along E-F line of FIG. 2.

As shown in FIG. 4, in the non-display area, the light-shielding layer 110, the overcoat layer 120 and the column spacers 300 are sequentially formed on the lower surface of the first substrate 100. The plurality of column spacers 300 are provided at fixed intervals.

In the non-display area, the signal line 210, the gate insulating film 220, the semiconductor layer 230, the metal layer 240 and the passivation layer 250 are sequentially formed on the upper surface of the second substrate 200.

Also, the liquid crystal layer 400 is formed between the first substrate 100 and the second substrate 200, e.g. between the overcoat layer 120 and the passivation layer 250 and between the column spacers 300 and the passivation layer 250.

In case of FIG. 4, a stacking structure in the region of the second substrate 200 confronting the region with the column spacer 300 is identical to a stacking structure in the region of the second substrate 200 confronting the region without the column spacer 300, but not limited to this structure. A stacking structure in the region of the second substrate 200 confronting the region with the column spacer 300 may be different from a stacking structure in the region of the second substrate 200 confronting the region without the column spacer 300, which will be described with reference to FIG. 5.

Figure 5:
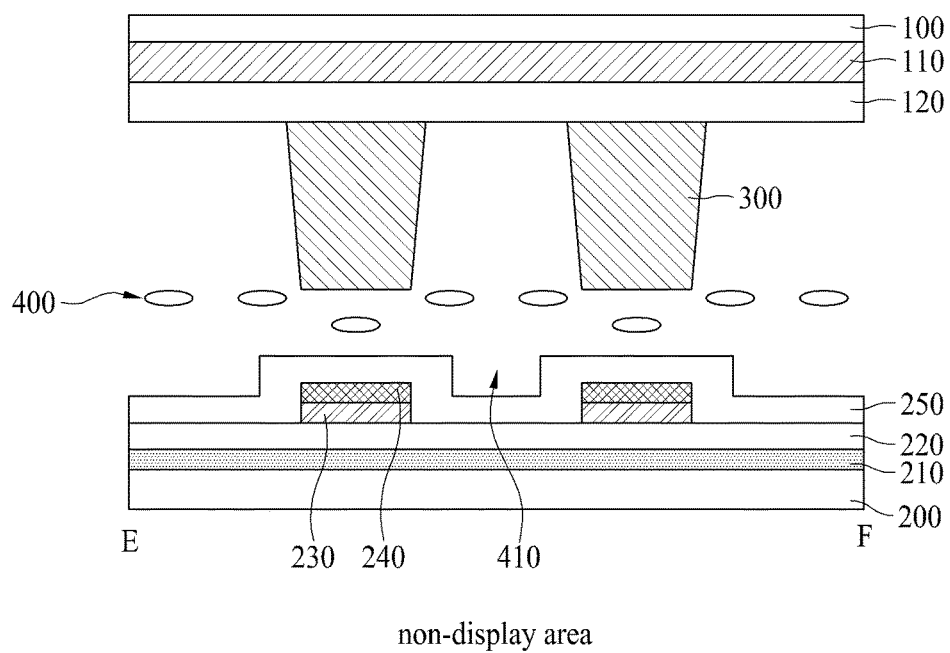
FIG. 5 is a cross sectional view illustrating a non-display area according to another embodiment of the present invention, which corresponds to a cross sectional view along E-F line of FIG. 2.

FIG. 5 is a cross sectional view illustrating a non-display area according to another embodiment of the present invention, which corresponds to a cross sectional view along E-F line of FIG. 2.

As shown in FIG. 5, in the non-display area, the light-shielding layer 110, the overcoat layer 120 and the column spacers 300 are sequentially formed on the lower surface of the first substrate 100. The plurality of column spacers 300 are provided at fixed intervals.

In the non-display area, the signal line 210, the gate insulating film 220, the semiconductor layer 230, the metal layer 240 and the passivation layer 250 are sequentially formed on the upper surface of the second substrate 200.

Also, the liquid crystal layer 400 is formed between the first substrate 100 and the second substrate 200.

In case of FIG. 5, a stacking structure in the region of the second substrate 200 confronting the region with the column spacer 300 is different from a stacking structure in the region of the second substrate 200 confronting the region without the column spacer 300.

That is, the semiconductor layer 230 and the metal layer 240 are formed in the predetermined region of the second substrate 200 confronting the region with the column spacer 300, but, the semiconductor layer 230 and the metal layer 240 are not formed in the remaining regions of the second substrate 200 confronting the remaining regions without the column spacer 300. The passivation layer 250 may be in contact with the gate insulating film 220 in those areas where the semiconductor 230 and the metal layer 240 are not formed.

In case of FIG. 5, a liquid crystal receiving portion 410 may be prepared in the thin film layer stack of the second substrate 200. The liquid crystal receiving portion 410 is positioned in the region in which the column spacer 300 is not formed, whereby the liquid crystal receiving portion 410 is not overlapped with the column spacer 300. Since the liquid crystal receiving portion 410 is prepared in the thin film layer stack of the second substrate 200, liquid crystal smoothly flows through the liquid crystal receiving portion 410.

Figure 6:
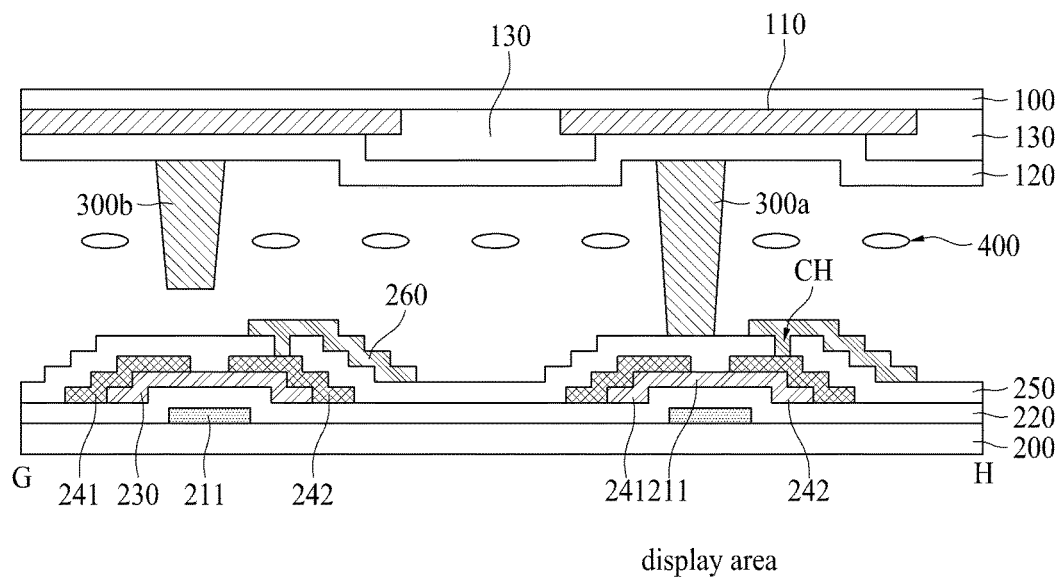
FIG. 6 is a cross sectional view illustrating a display area according to one embodiment of the present invention, which corresponds to a cross sectional view along G-H line of FIG. 2.

FIG. 6 is a cross sectional view illustrating the display area in the LCD device according to one embodiment of the present invention, which corresponds to a cross sectional view along G-H line of FIG. 2.

As shown in FIG. 6, in the display area, the light-shielding layer 110, a color filter layer 130, the overcoat layer 120 and column spacers 300a and 300b are sequentially formed on the lower surface of the first substrate 100.

The light-shielding layer 110 is provided on the lower surface of the first substrate 100, and more particularly, formed in a region between each of the pixels. The light-shielding layer 110 is formed in a matrix configuration, and the inside of each pattern in the matrix configuration is provided with a pixel region.

The color filter layer 130 is formed in the pixel region between each pattern of the light-shielding layer 110. The color filter layer 130 may include red, green and blue color filters provided in the respective pixels.

The overcoat layer 120 is formed on the lower surface of the light-shielding layer 110 and on a lower surface of the color filter layer 130.

The column spacers 300a and 300b are formed on the lower surface of the overcoat layer 120. The column spacers 300a and 300b are overlapped with the light-shielding layer 110.

The column spacers 300a and 300b may include a main column spacer 300a and an auxiliary column spacer 300b. The main column spacer 300a is in contact with the region of the first substrate 100 and the region of the second substrate 200, and the auxiliary column spacer 300b is in contact only with the region of the first substrate 100. For example, the main column spacer 300a may be in contact with the lower surface of the overcoat layer 120 and the upper surface of the passivation layer 250, while the auxiliary column spacer 300b may be in contact with the lower surface of the overcoat layer 120 only, as shown. While the main column spacer 300a is formed at a height of a cell gap, the auxiliary column spacer 300b is formed at a height which is smaller than the cell gap. In other words, the height of the main column spacer 300a may be equal to a distance between the overcoat layer 120 and the passivation layer 250 (e.g., a distance from the upper surface of the passivation layer to the lower surface of the overcoat layer) at the location where the main column spacer 300a is formed, and the height of the auxiliary column spacer 300b may be less than a distance between the overcoat layer 120 and the passivation layer 250 (e.g., a distance from the upper surface of the passivation layer to the lower surface of the overcoat layer) at the location where the auxiliary column spacer 300b is formed.

In order to manufacture the LCD device, an amount of liquid crystal for the liquid crystal layer 400 is determined in consideration of the cell gap. In this case, the liquid crystal layer 400 may be unfilled or overfilled due to an error in determining the amount of liquid crystal. In this context, "unfilled" may refer to a situation where the determined amount of liquid crystal is smaller than the amount of liquid crystal actually needed for filling, while "overfilled" may refer to a situation where the determined amount of liquid crystal is larger than the amount of liquid crystal actually needed for filling.

The auxiliary column spacer 300b is lower than the cell gap. In other words, a height of the auxiliary spacer 300b is smaller than the cell gap (at the location of the auxiliary column spacer 300b). The auxiliary column spacer 300b may be shorter than the main column spacer 300a. Thus, in case of the unfilled or overfilled liquid crystal layer 400, the cell gap may be adjusted actively due to the improvement of fluidity of the liquid crystal layer 400. If there is the unfilled or overfilled liquid crystal layer 400 under the condition that only the main column spacer 300a is formed in the LCD device, it is difficult to actively adjust the cell gap, thereby causing light leakage or defects such as spots. If providing the auxiliary column spacer 300b, the cell gap is actively adjusted even in case of the unfilled or overfilled liquid crystal layer 400, thereby preventing the light leakage or defects such as spots.

Also, when an external force is applied to the LCD device, the auxiliary column spacer 300b together with the main column spacer 300a maintains the cell gap, thereby preventing the collapse of cell gap. Eventually, when there is the unfilled or overfilled liquid crystal layer 400 or the external force is applied to the LCD device, the main column spacer 300a and the auxiliary column spacer 300b actively adjust the cell gap of the LCD device.

In the display area, there are the main column spacer 300a and the auxiliary column spacer 300b. Meanwhile, in case of the aforementioned non-display area, it shows only the auxiliary column spacer. In the same manner as in the display area, the main column spacer and the auxiliary column spacer may be formed in the non-display area, if needed.

In the display area, the gate electrode 211, the gate insulating film 220, the semiconductor layer 230, the source/drain electrodes 241/242, the passivation layer 250 and a pixel electrode 260 are formed on the upper surface of the second substrate 200.

A structure of each of the gate electrode 211, the gate insulating film 220, the semiconductor layer 230 and the source/drain electrodes 241/242 is identical to the aforementioned structure of FIG. 3, whereby a detailed description for the same parts will be omitted.

The passivation layer 250 is formed on the upper surface of the source electrode 241 and the drain electrode 242. A contact hole (CH) is formed in the passivation layer 250, whereby the drain electrode 242 is exposed via the contact hole (CH).

The pixel electrode 260 is patterned on the passivation layer 250. The pixel electrode 260 is connected with the drain electrode 242 via the contact hole (CH).

Figure 7:
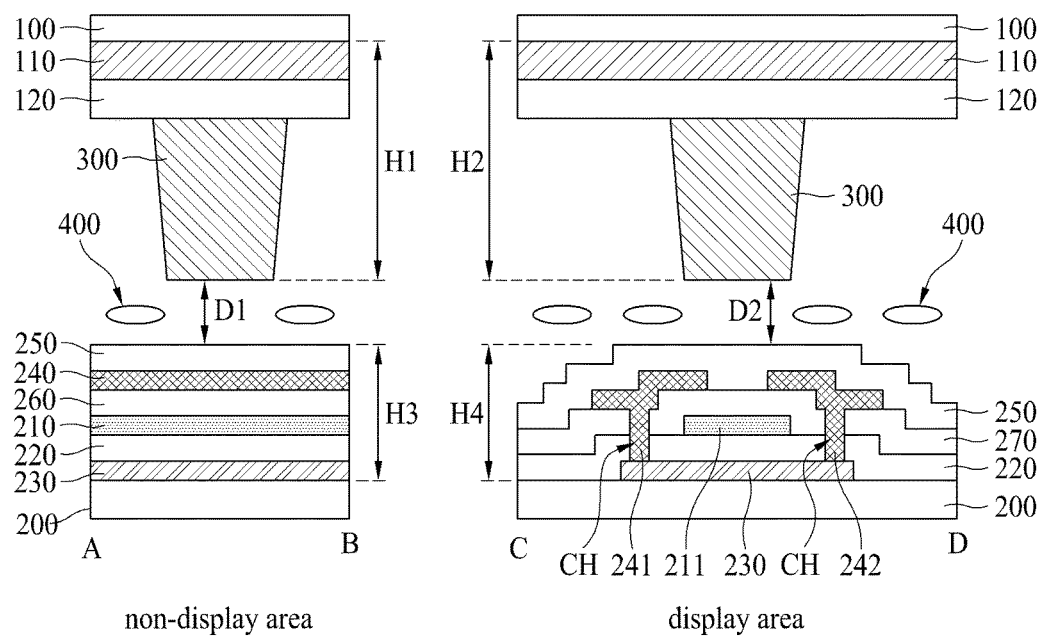
FIG. 7 is a cross sectional view illustrating an LCD device according to another embodiment of the present invention.

FIG. 7 is a cross sectional view illustrating an LCD device according to another embodiment of the present invention, which corresponds to a cross sectional view along A-B line and C-D line of FIG. 2. The above LCD device shown in FIG. 3 relates to a bottom gate structure where the gate electrode 211 is positioned below the semiconductor layer 230. Meanwhile, the LCD device shown in FIG. 7 relates to a top gate structure where the gate electrode 211 is positioned above the semiconductor layer 230.

A stacking structure of a first substrate 100 is identical to the above stacking structure shown in FIG. 3.

That is, in both display area and non-display area, the light-shielding layer 110 is formed on the lower surface of the first substrate 100, the overcoat layer 120 is formed on the lower surface of the light-shielding layer 110, and the column spacer 300 is formed on the lower surface of the overcoat layer 120. Accordingly, a distance (H1) from the first substrate 100 (e.g., from the lower surface of the first substrate) to the lower end of the column spacer 300 in the non-display area is identical to a distance (H2) from the first substrate 100 (e.g., from the lower surface of the first substrate) to the lower end of the column spacer 300 in the display area.

A stacking structure of the second substrate 200 is different from the above stacking structure shown in FIG. 3.

First, a structure of the second substrate 200 in the display area will be described as follows.

On the second substrate 200 in the display area, there is a thin film layer stack including the semiconductor layer 230, the gate insulating film 220, the gate electrode 211, an insulating interlayer film 270, the source or drain electrode 241 or 242 and the passivation layer 250.

In more detail, the semiconductor layer 230 is formed on the upper surface of the second substrate 200, the gate insulating film 220 is formed on the upper surface of the semiconductor layer 230, the gate electrode 211 is formed on the upper surface of the gate insulating film 220, the insulating interlayer film 270 is formed on the upper surface of the gate electrode 211, the source electrode 241 and the drain electrode 242 facing each other are formed on an upper surface of the insulating interlayer film 270, and the passivation layer 250 is formed on the upper surface of the source electrode 241 and the drain electrode 242.

Two contact holes (CH) are provided in the gate insulating film 220 and the insulating interlayer film 270. Thus, one end and an opposite end of the semiconductor layer 230 are exposed via a respective contact hole (CH), and the source electrode 241 and the drain electrode 242 are respectively connected with the one end and the other end of the semiconductor layer 230 via the respective contact hole (CH).

Then, a structure of the second substrate 200 in the non-display area will be described as follows.

On the second substrate 200 in the non-display area, there is a thin film layer stack including the semiconductor layer 230, the gate insulating film 220, the signal line 210, the insulating interlayer film 270, the metal layer 240 and the passivation layer 250.

In more detail, the semiconductor layer 230 is formed on the upper surface of the second substrate 200, the gate insulating film 220 is formed on the upper surface of the semiconductor layer 230, the signal line 210 is formed on the upper surface of the gate insulating film 220, the insulating interlayer film 270 is formed on the upper surface of the signal line 210, the metal layer 240 is formed on the upper surface of the insulating interlayer film 270, and the passivation layer 250 is formed on the upper surface of the metal layer 240.

The signal line 210 is provided to apply a common signal to a common electrode. The semiconductor layer 230 of the non-display area and the semiconductor layer 230 of the display area are formed of the same material by the same manufacturing process, and the metal layer 240 of the non-display area and the source and drain electrodes 241 and 242 of the display area are formed of the same material by the same manufacturing process.

The gate insulating film 220, the insulating interlayer film 270 and the passivation layer 250 extend from the display area to the non-display area.

Accordingly, a stacking structure of the second substrate 200 in the display area is identical to a stacking structure of the second substrate 200 in the non-display area.

In case of the display area, the semiconductor layer 230, the gate insulating film 220, the gate electrode 211, the insulating interlayer film 270, the source/drain electrode 241/242 and the passivation layer 250 are sequentially stacked on the second substrate 200. In case of the non-display area, the semiconductor layer 230, the gate insulating film 220, the signal line 210, the insulating interlayer film 270, the metal layer 240 and the passivation layer 250 are sequentially stacked on the second substrate 200.

At this time, a thickness of the semiconductor layer 230 in the display area is identical to a thickness of the semiconductor layer 230 in the non-display area, a thickness of the gate insulating film 220 in the display area is identical to a thickness of the gate insulating film 220 in the non-display area, a thickness of the gate electrode 211 in the display area is identical to a thickness of the signal line 210 in the non-display area, a thickness of the insulating interlayer film 270 in the display area is identical to a thickness of the insulating interlayer film 270 in the non-display area, a thickness of the source/drain electrode 241/242 in the display area is identical to a thickness of the metal layer 240 in the non-display area, and a thickness of the passivation layer 250 in the display area is identical to a thickness of the passivation layer 250 in the non-display area.

Accordingly, a distance (H3) from the second substrate 200 (e.g., from the upper surface of the second substrate) to the upper end of the passivation layer 250 in the non-display area is identical to a distance (H4) from the second substrate 200 (e.g., from the upper surface of the second substrate) to the upper end of the passivation layer 250 in the display area.

As described above, according to another embodiment of the present invention, the distance (H1) from the first substrate 100 (e.g., from the lower surface of the first substrate) to the lower end of the column spacer 300 in the non-display area is identical to the distance (H2) from the first substrate 100 (e.g., from the lower surface of the substrate) to the lower end of the column spacer 300 in the display area. Also, the distance (H3) from the second substrate 200 (e.g., from the upper surface of the second substrate) to the upper end of the passivation layer 250 in the non-display area is identical to the distance (H4) from the second substrate 200 (e.g., from the upper surface of the second substrate) to the upper end of the passivation layer 250 in the display area. Thus, a distance (D1) from the lower end of the column spacer 300 to the upper end of the passivation layer 250 in the non-display area is identical to a distance (D2) from the lower end of the column spacer 300 to the upper end of the passivation layer 250 in the display area. As a result, it is possible to maintain a uniform cell gap in both the display area and the non-display area.

The LCD device according to the various embodiments of the present invention may include various modes generally known to those in the art, for example, TN (Twisted Nematic), VA (Vertical Alignment), IPS (In-plane Switching) or FFS (Fringe Field Switching) mode. In case of the TN and VA modes, the common electrode is formed on the first substrate 100, whereby a vertical electric field is formed between the pixel electrode and the common electrode. In case of the IPS and FFS modes, the pixel electrode and the common electrode are provided on the second substrate 200, whereby a horizontal electric field is formed between the pixel electrode and the common electrode. In each of the aforementioned modes, each of the pixel and common electrodes may be changed to various shapes generally known to those in the art.

According to the present invention, the distance from the second substrate to the end of the thin film layer stack in the display area is identical to the distance from the second substrate to the end of the thin film layer stack in the non-display area so that it is possible to maintain the uniform cell gap in both the display area and the non-display area.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A liquid crystal display device comprising:
   first and second substrates;
   a liquid crystal layer between the first and second substrates;
   at least one column spacer in each of a display area and a non-display area of the liquid crystal display device on the first substrate; and
   a thin film layer stack in the display area and non-display area on the second substrate,
   wherein a distance from the second substrate to an end of a portion of the thin film layer stack in the display area is identical to a distance from the second substrate to an end of a portion of the thin film layer stack in the non-display area, said portion of the thin film layer stack in the display area disposed between the second substrate and said at least one column spacer in the display area, and said portion of the thin film layer stack in the non-display area disposed between the second substrate and said at least one column spacer in the non-display area, and
   wherein a stacking structure of the portion of the thin film layer stack in the display area is identical to a stacking structure of the portion of the thin film layer stack in the non-display area, wherein in the region of the non-display area having a column spacer, the thin film layer stack comprises a signal line, a gate insulating film on the signal line, a semiconductor layer on the gate insulating film, a metal layer on the semiconductor layer and a passivation layer on the metal layer, and
   wherein in the region of the non-display area not having a column spacer, the thin film layer stack comprises the signal line, the gate insulating film on the signal line, and the passivation layer on the gate insulating film and in contact with the gate insulating film.

2. The liquid crystal display device of claim 1, wherein said end of said portion of the thin film layer stack in the non-display area or display area corresponds to an upper surface of the thin film layer stack that is in contact with the liquid crystal layer.

3. The liquid crystal display device of claim 1, wherein a distance from the first substrate to a lower end of the at least one column spacer in the non-display area is identical to a distance from the first substrate to a lower end of the at least one column spacer in the display area.

4. The liquid crystal display device of claim 1, wherein a distance between said end of said portion of the thin film layer stack in the non-display area and the at least one column spacer in the non-display area is identical to a distance between said end of said portion of the thin film layer stack in the display area and the at least one column spacer in the display area.

5. The liquid crystal display device of claim 1, wherein the at least one column spacer in the display area or the at least one column spacer in the non-display area comprises a main column spacer and an auxiliary column spacer, wherein the auxiliary column spacer is shorter than the main column spacer, and
wherein the main column spacer is in contact with the thin film layer stack.

6. The liquid crystal display device of claim 1, wherein the at least one column spacer in the non-display area comprises a plurality of column spacers spaced apart from one another, wherein a stacking structure of the thin film layer stack in a region of the non-display area having a column spacer is identical to a stacking structure of the thin film layer stack in a region of the non-display area not having a column spacer.

7. The liquid crystal display device of claim 1, wherein the at least one column spacer in the non-display area comprises a plurality of column spacers spaced apart from one another, wherein a stacking structure of the thin film layer stack in a region of the non-display area having a column spacer is different from a stacking structure of the thin film layer stack in a region of the non-display area not having a column spacer, and
wherein the thin film layer stack comprises a liquid crystal receiving portion in the region of the non-display area not having a column spacer.

8. The liquid crystal display device of claim 1, wherein the thin film layer stack in each of the display area and non-display area comprises a passivation layer, and wherein said end of said portion of the thin film layer stack in the display area or non-display area corresponds to an upper surface of the passivation layer that is in contact with the liquid crystal layer.

9. The liquid crystal display device of claim 8, wherein the thin film layer stack in the display area comprises:
a gate electrode;
a gate insulating film on the gate electrode;
a semiconductor layer on the gate insulating film;
a source electrode and a drain electrode on the semiconductor layer; and
the passivation layer on the source and drain electrodes; and
wherein the thin film layer stack in the non-display area comprises:
a signal line;
a gate insulating film on the signal line;
a semiconductor layer on the gate insulating film;
a metal layer on the semiconductor layer; and
the passivation layer on the metal layer.

10. The liquid crystal display device of claim 9, wherein:
a thickness of the gate electrode is identical to a thickness of the signal line;
a thickness of the gate insulating film in the display area is identical to a thickness of the gate insulating film in the non-display area;
a thickness of the semiconductor layer in the display area is identical to a thickness of the semiconductor layer in the non-display area;
a thickness of the source and drain electrodes in the display area is identical to a thickness of the metal layer in the non-display area; and
a thickness of the passivation layer in the display area is identical to a thickness of the passivation layer in the non-display area.

11. The liquid crystal display device of claim 9, wherein:
the gate electrode and the signal line are formed of the same material by the same manufacturing process;
the gate insulating film on the gate electrode and the gate insulating film on the signal line are formed of the same material by the same manufacturing process;
the semiconductor layer in the display area and the semiconductor layer in the non-display area are formed of the same material by the same manufacturing process;
the source and drain electrodes and the metal layer are formed of the same material by the same manufacturing process; and
the passivation layer in the display area and the passivation layer in the non-display area are formed of the same material by the same manufacturing process.

12. The liquid crystal display device of claim 8, wherein the thin film layer stack in the display area comprises:
a semiconductor layer;
a gate insulating film on the semiconductor layer;
a gate electrode on the gate insulating film;
an insulating interlayer film on the gate electrode;
a source electrode and a drain electrode on the insulating interlayer film; and
the passivation layer on the source and drain electrodes; and
wherein the thin film layer stack in the non-display area comprises:
a semiconductor layer;
a gate insulating film on the semiconductor layer;
a signal line on the gate insulating film;
an insulating interlayer film on the signal line;
a metal layer on the insulating interlayer film; and
the passivation layer on the metal layer.

13. The liquid crystal display device of claim 12, wherein:
a thickness of the semiconductor layer in the display area is identical to a thickness of the semiconductor layer in the non-display area;
a thickness of the gate insulating film in the display area is identical to a thickness of the gate insulating film in the non-display area;
a thickness of the gate electrode in the display area is identical to a thickness of the signal line in the non-display area;
a thickness of the insulating interlayer film in the display area is identical to a thickness of the insulating interlayer film in the non-display area;
a thickness of the source and drain electrodes in the display area is identical to a thickness of the metal layer in the non-display area; and
a thickness of the passivation layer in the display area is identical to a thickness of the passivation layer in the non-display area.

14. The liquid crystal display device of claim 1, further comprising a light shielding layer on the first substrate and an overcoat layer on the light shielding layer,
wherein the at least one column spacer in each of the display area and non-display area is disposed on the overcoat layer.

15. A liquid crystal display device comprising:
first and second substrates;
a liquid crystal layer between the first and second substrates;

at least one column spacer in each of a display area and a non-display area of the liquid crystal display device on the first substrate; and a thin film layer stack in the display area and non-display area on the second substrate, wherein a stacking structure of the portion of the thin film layer stack in the display area is identical to a stacking structure of the portion of the thin film layer stack in the non-display area, wherein in the region of the non-display area having a column spacer, the thin film layer stack comprises a signal line, a gate insulating film on the signal line, a semiconductor layer on the gate insulating film, a metal layer on the semiconductor layer and a passivation layer on the metal layer, and wherein in the region of the non-display area not having a column spacer, the thin film layer stack comprises the signal line, the gate insulating film on the signal line, and the passivation layer on the gate insulating film and in contact with the gate insulating film.

16. The liquid crystal display device of claim 15, wherein a gap exists between said at least of one column spacer and the thin film layer stack in both of the display area and the non-display area.

17. The liquid crystal display device of claim 16, further comprising:

a main column spacer in contact with the thin film layer stack, the main column spacer longer than the at least one column spacer.

18. The liquid crystal display device of claim 16, wherein the at least one column spacer in the non-display area comprises a plurality of column spacers spaced apart from one another, wherein a thickness of the thin film layer stack in a region of the non-display area having a column spacer is lower than a thickness of the thin film layer stack in a region of the non-display area not having a column spacer.

* * * * *